Figure 10:
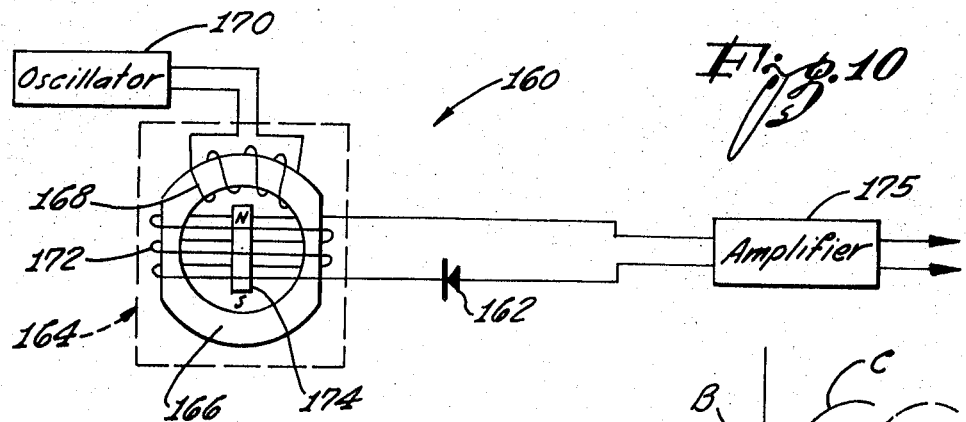

United States Patent

[11] 3,617,874

[72] Inventor Friedrick M. O. Forster
 Der Schoene Weg 144, 741 Reutlingen, Germany
[21] Appl. No. 28,172
[22] Filed Apr. 13, 1970
[45] Patented Nov. 2, 1971
 Continuation of application Ser. No. 661,458, Aug. 17, 1967.

[54] MAGNETIC LEAKAGE FIELD FLAW DETECTOR UTILIZING TWO RING CORE SENSORS
 3 Claims, 14 Drawing Figs.
[52] U.S. Cl. .................................................... 324/37
[51] Int. Cl. ............................................... G01r 33/12
[50] Field of Search ........................................... 324/37

[56] References Cited
 UNITED STATES PATENTS
 2,758,276  8/1956  Foerster ..................... 324/34
 3,091,733  5/1963  Fearon et al. ................. 324/37
 FOREIGN PATENTS
 868,545  5/1961  Great Britain ................ 324/37
 1,255,436  1/1961  France ....................... 324/37

OTHER REFERENCES
 Geyger, W. A., Flux Gate Magnetometer Uses Toroidal Core; Electronics; June, 1962 pp. 48– 52 (324-43) *[ Copy sent in Parent Application]
 Aschenbrenner et al., EineAnordung zur Registrierung Rascher Magnetischer Storrungen; Hochfrequenztechnik Und Electroakustik; #47, Heft 6; June 1936, pp. 177-181 (Copy in 324-43)

Primary Examiner—Alfred E. Smith
Assistant Examiner—R. J. Corcoran
Attorney—Dan R. Sadler ABSTRACT: This invention is concerned with magnetic flaw detection. A magnetic field is impressed upon a workpiece, which field is distorted in the region of a flaw. The flaw detector employed consists of a ring core of magnetic material. An energizing coil is wound upon the core to create a magnetic field totally within the core. A pickup winding is wound diametrically about said core. When the core is scanned across the workpiece the core intercepts the leakage field of the flaw. The interaction of the leakage field and the energized field in the core create an output signed on the pickup winding. Two cores can be used together to yield a signal indicative of the gradient of the stray field.

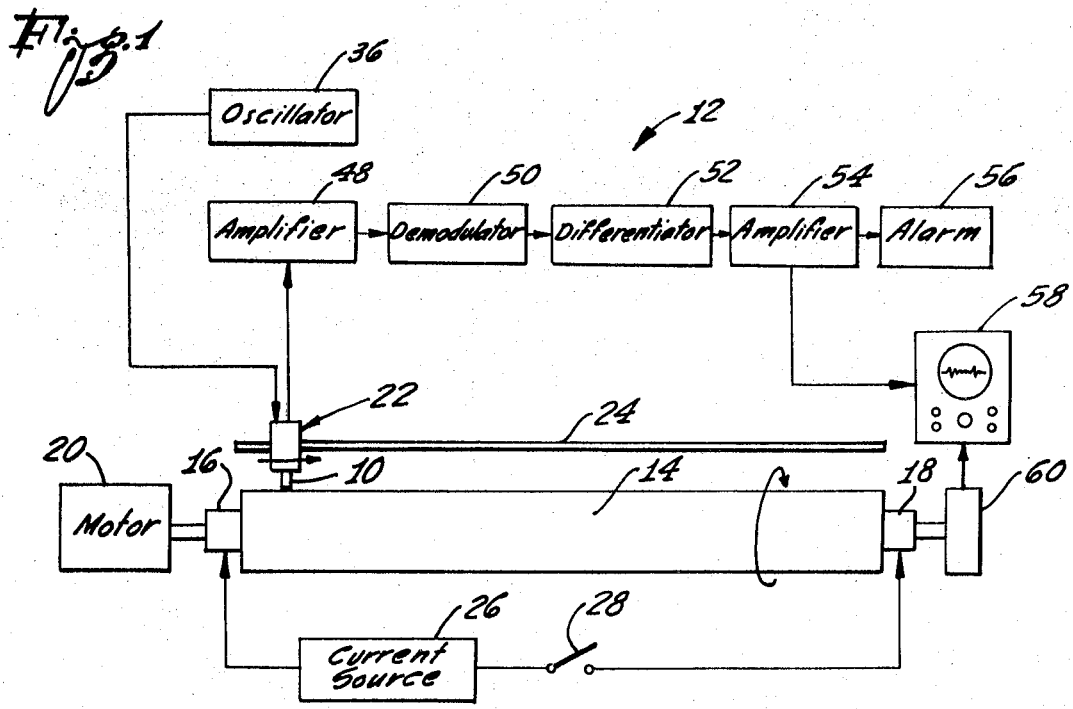
Fig. 1
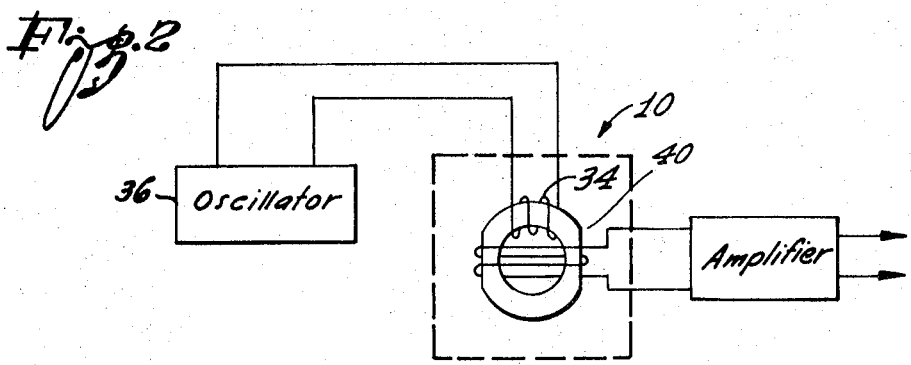
Fig. 2
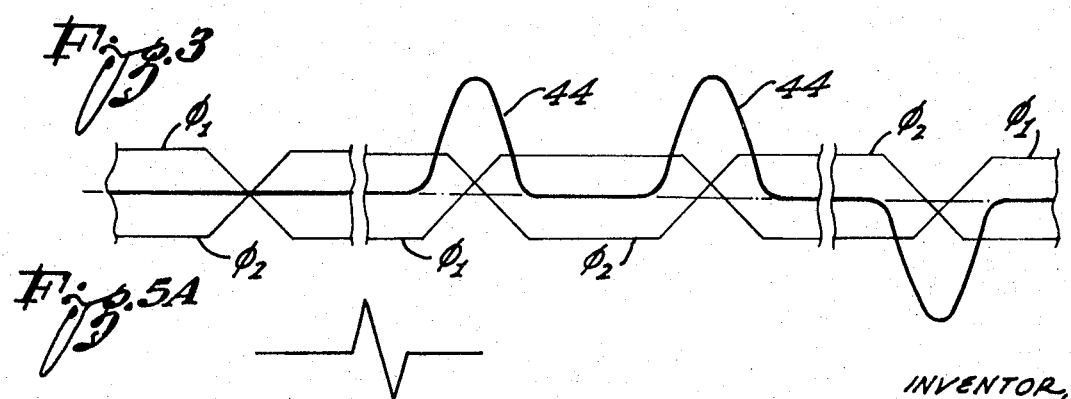
Fig. 3
Fig. 5A
Fig. 5B
INVENTOR:
Friedrich M.O. Förster
R Sadler
ATTORNEY

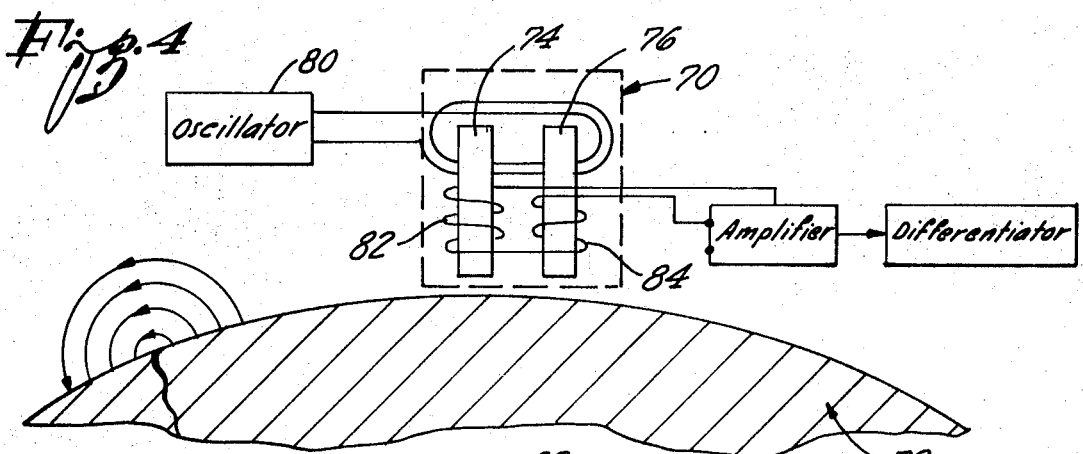
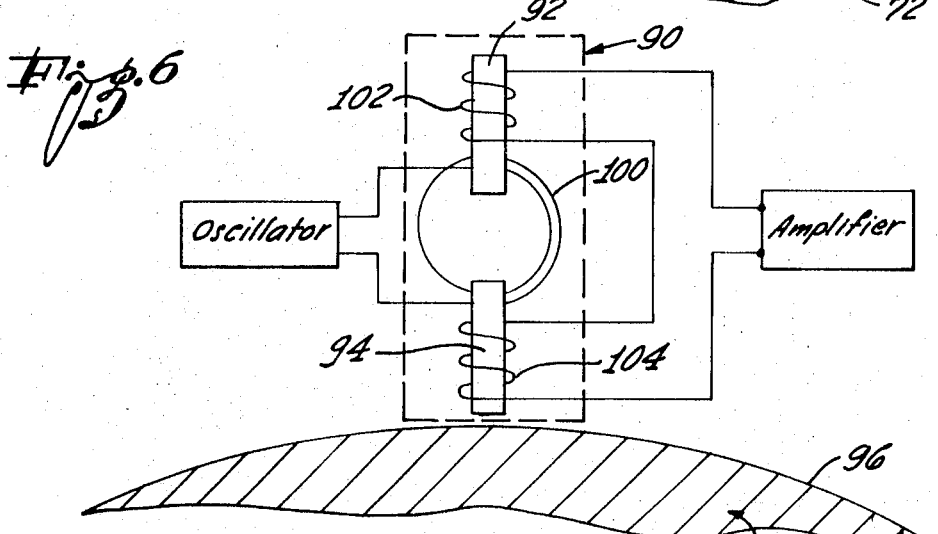
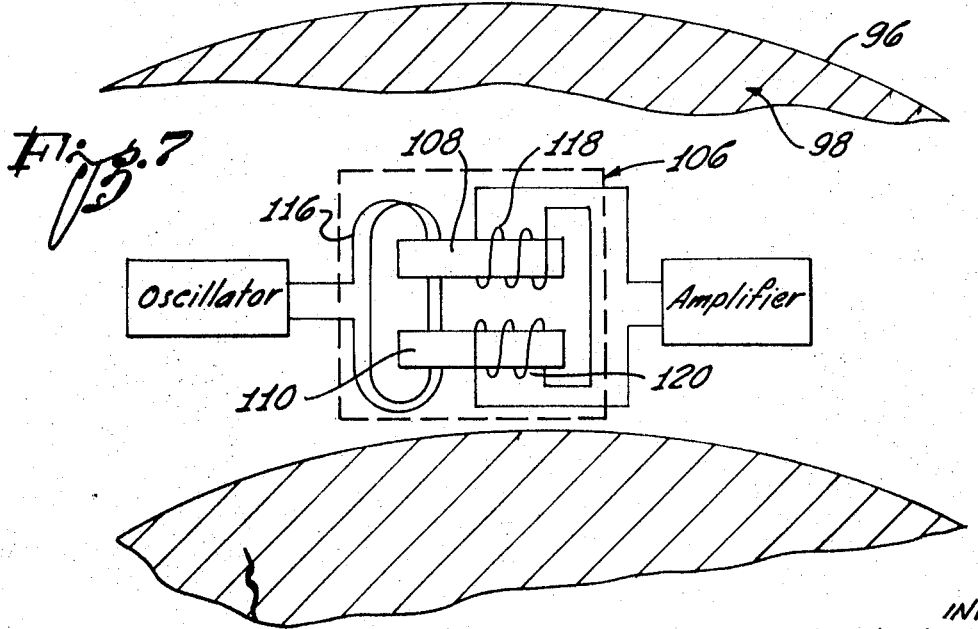
INVENTOR:
Friedrich M.O. Förster
ATTORNEY

Fig. 9
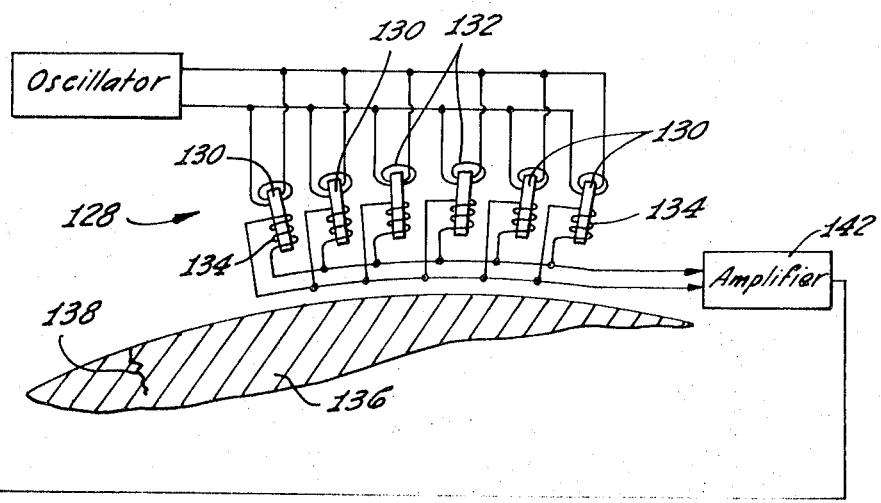
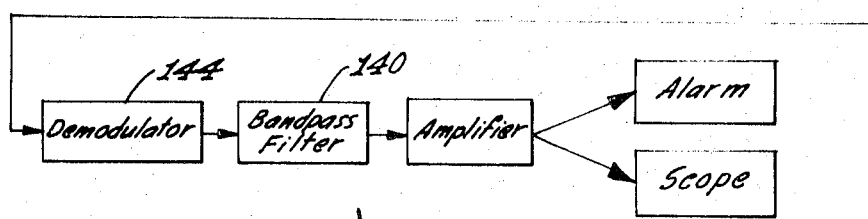
Fig. 8
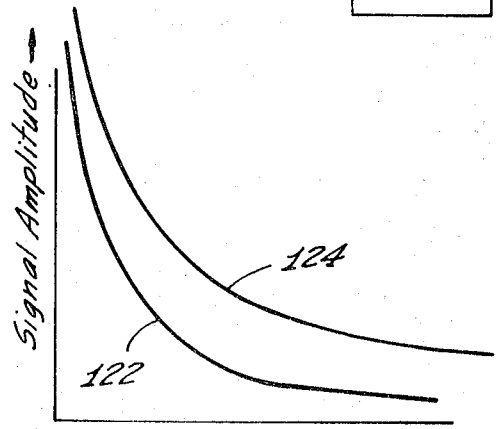
INVENTOR
Friedrich M. O. Förster
ATTORNEY INVENTOR:
Friedrich M. O. Förster R Sadler
ATTORNEY

MAGNETIC LEAKAGE FIELD FLAW DETECTOR UTILIZING TWO RING CORE SENSORS

...CROSS REFERENCE TO RELATED APPLICATIONS

This is a "streamlined" continuation of copending application Ser. No. 661,458 filed Aug. 17, 1967 for a Magnetic Current Nondestructive Testing System on behalf of Friedrich M. O. Forster.

The present invention relates to means for measuring the intensities of magnetic flux fields and more particularly to means for measuring the intensity of a magnetic flux field at a small point.

In one form of nondestructive testing the workpiece is magnetized whereby stray magnetic fields are produced around any defects. The workpiece is then scanned by a magnetic probe to locate and identify the stray fields. Various types of probes such as induction coils, Hall effect probes etc. have been employed Although such probes are satisfactory for some applications, they have several limitations. For example, their sensitivity is low and/or their size is so large as to prevent their detecting very small defects.

Another form of pickup probe that is especially well suited for measuring a magnetic flux field and particularly the types of stray fields present in a nondestructive testing system is disclosed and claimed in U.S. Pat. No. 2,758,276 entitled Apparatus for the Non-Destructive Testing of Magnetizable Objects. As disclosed therein a pair of magnetically permeable cores are provided for disposition in the unknown flux field. Both of the cores are elongated cylinders aligned with the field whereby the unknown flux extends axially of the cores. Primary windings on each core produce alternating flux fields which saturate the cores in opposition and conjunction with the unknown flux field. Separate secondary windings are provided on the two cores so as to be responsive to the rates of change of the flux in the two cores.

In the event the unknown or external field is zero, the cores saturate symmetrically and the output from the two secondaries which are connected in series opposition is zero. However, if there is an external field the two cores do not saturate symmetrically and an unbalanced voltage is produced by the two secondaries each time the driving fields from the primaries reverse. The magnitude of this second harmonic unbalance voltage is a function of the magnitude of the unknown flux field and its phase relation with reference to the driving fields is a function of the direction of the unknown field.

Although probes of the foregoing variety are suitable for use in nondestructive testing they have not been entirely satisfactory for locating very small defects. Among other things it is necessary to saturate the two cores and this requires a substantial amount of power. As explained in said patent this results in substantial amounts of heat being being generated within the probe. To reduce this heating effect it is necessary for the sensitivity of the probe to be reduced. Moreover, if the two cores are reduced in size beyond a predetermined limit the temperatures of the cores rise excessively. As a consequence the size of the probe cannot be reduced below a lower limit which in turn has severely limited the ability to locate very small defects.

The present invention provides means for overcoming the foregoing difficulty. More particularly the present invention provides means for measuring the density of a flux field at a very small point, particularly stray magnetic fields such as are commonly produced by a small defect.

In the limited number of embodiments disclosed herein this is accomplished by providing a very small probe or microprobe that is responsive to the direction and magnitude of a flux field at a point. The probe includes a single core which forms a loop or a closed magnetic circuit. A primary winding is coupled to the core so as to produce a magnetic field extending around the entire loop. The primary winding is connected to an oscillator and drives the core beyond saturation during both halves of the cycle. A secondary winding is provided around the entire core so as to be responsive to the rate of change of all the flux, i.e. the rate of change of the flux in the opposite sides of the core. In the event there is no external field all portions of the core will saturate the same. As a consequence the output from the secondary winding will be zero. However, in the event the external field has a component parallel to the axis of the secondary the opposite sides of the core will not saturate symmetrically and a signal will be produced in the secondary. The magnitude and polarity of the signal are a function of the density and direction of the external field.

Since the core is a closed magnetic circuit very little power is required to drive it. As a consequence the size of the core may be reduced virtually without limit. This, in turn, permits the probe to be very small whereby very small increments in a magnetic field may be measured. Thus the probe is capable of detecting magnetic fields produced by very small defects.

These and other features and advantages of the present invention will become readily apparent from the following detailed description of several embodiments thereof, particularly when taken in connection with the accompanying drawings wherein like reference numerals refer to like parts and wherein;

FIG. 1—is a block diagram of a nondestructive testing system embodying one form of the present invention;

FIG. 2—is a block diagram of a portion of the system of FIG. 1 and a view of the pickup probe used therein;

FIG. 3—is a set of waveforms illustrating one set of operating characteristics of the pickup probe of FIG. 2;

FIG. 4—is a block diagram of a portion of a nondestructive testing system and a view of the pickup probe used therein embodying another form of the present invention;

FIGS. 5A and 5B—are sets of waveforms produced in the pickup probe and system in FIG. 4;

FIG. 6—is a block diagram of a portion of a nondestructive testing system and a view of the pickup probe used therein embodying another form of the present invention;

FIG. 7—is a block diagram of a portion of nondestructive testing system and a view of the pickup probe used therein embodying a still further form of the present invention;

FIG. 8—is a set of curves comparing the operating characteristics of the nondestructive testing systems of FIGS. 6 nd 7, and FIG. 9—is a block diagram of a portion of a nondestructive test system and a view of the pickup probe used therein embodying another form of the present invention.

Figure 11:
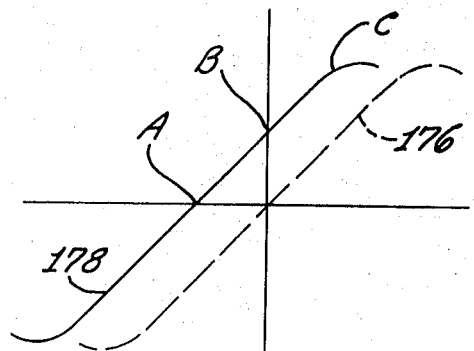
Figure 12:
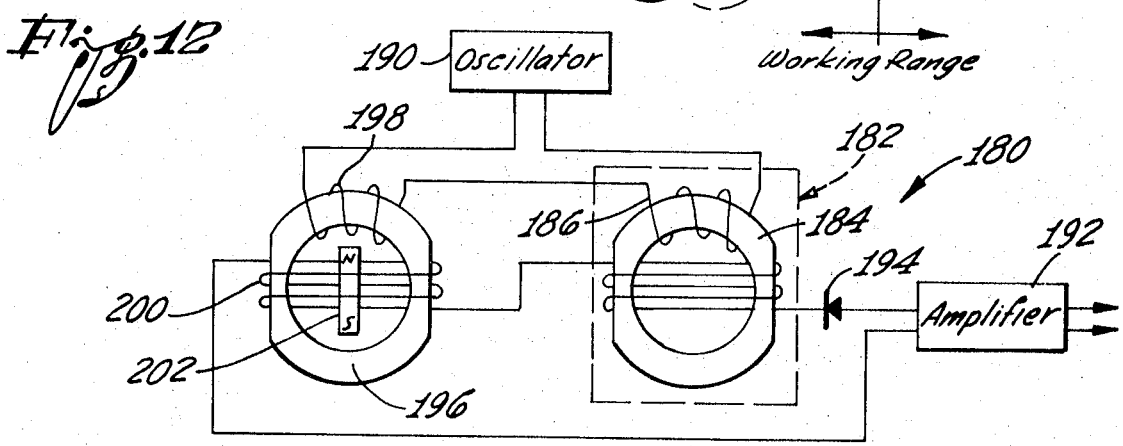
Figure 13:
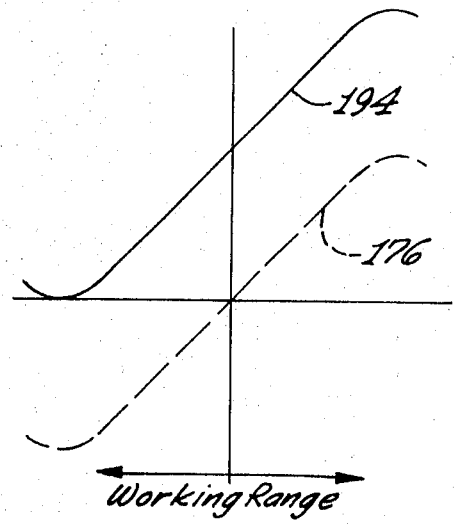

FIG. 10—is a block diagram of a portion of a system utilizing a different form of pickup probe;

FIG. 11—is a graph illustrating an operating characteristics of the probe of FIG. 10;

FIG. 12—is a block diagram of a portion of a system utilizing a still different form of pickup probe, and FIG. 13—is a graph illustrating an operating characteristic of the probe of FIG. 12.

Referring to the drawings in more detail and particularly to FIGS. 1, 2 and 3 thereof, the present invention is especially adapted to be embodied in a probe 10 for producing a signal that is a function of the intensity and direction of a magnetic field. Although the probe 10 may be constructed in relatively large size it is particularly suitable for being made in very small sizes for measuring magnetic fields at a very small point. In the present instance the probe 10 is especially adapted for use in a nondestructive testing system 12 for locating defects in a workpiece 14. More particularly the probe 10 is capable of scanning across the surface of the workpiece 14 and locating magnetic fields produced around defects in the workpiece 14.

The testing system 12 includes a support for the workpiece 14. For reasons that will become apparent subsequently, the present support includes a pair of chucks 16–18 for gripping the opposite ends of the workpiece 14 and a motor 20 for rotating them about their axis. The probe 10 is mounted in a search unit 22 carried by a guide 24 disposed parallel to the axis of rotation. The search unit 22 is effective to move along the guide 24 while the workpiece 12 is rotating. As a consequence the probe 10 will spirally scan the entire exterior surface of the workpiece 14 and pass through any magnetic fields that may be present adjacent this surface.

The workpiece 14 may be magnetized by any suitable means such as a magnet having one or more pole faces positioned next to the workpiece 14. However, in the present instance a current source 26 is provided for circulating a magnetizing current through the workpiece 14 whenever the switch 28 is closed. This switch 28 may remain closed throughout the entire test so as to produce a very dense flux field in and around any defects. However, it has been found that normally the switch 28 may be closed for just a few seconds prior to making the test. The resultant short duration current will permanently magnetize the workpiece 14 whereby residual magnetic fields will remain adjacent the defects. Although the residual field is less than the field occurring when the current is flowing the probe 10 is sufficiently sensitive to insure even the weaker residual fields being detected.

When the current flows axially through the workpiece 14 it produces a magnetic flux field that extends in the circumferential direction around the workpiece 14. If the workpiece is homogenous the resultant magnetic flux field is essentially free of any discontinuities or distortions. However, if there is a discontinuity n the workpiece 14 and particularly a defect such as a crack, the magnetic field will be disturbed. Under these circumstances a substantial amount of flux will be present just above the surface of the workpiece 14 and produce what is sometimes referred to as a stray field.

The intensity, size and configuration etc. of the stray field outside of the workpiece are functions of the size, shape, depth etc. of the defect, particularly any components thereof disposed at right angles to the magnetizing field. If the defect is small and/or is very narrow (i.e. it has a very small air space) the field will also be small. Both the height of the field above the surface of the workpiece and its width are small. Accordingly the ability to locate and identify small defects is dependent upon the ability of the probe to resolve these very small stray magnetic fields. For most applications where extremely small defects are of only secondary interest the overall dimensions of the probe are normally on the order of about 0.060 to 0.080 inches. However in testing systems intended to locate very small defects, probes have frequently been proved with outside dimensions on the order of about 0.040 inches. It should be understood if a greater resolving capability is desired even smaller probes can and have been used.

The probe 10, which is shown best in FIG. 2, includes a magnetic core 30. The core 30 is preferably made from a ferromagnetic material having a high permeability whereby any flux adjacent the probe 10 will pass through the core 30. Also a magnetic field of any particular density can be produced inside of the core 30 with a minimum amount of magnetomotive force.

The core 30 normally has an annular or circular shape with an opening 32 passing through its center. Annular as used herein is construed in its broadest sense and includes not only circular shapes but also irregular shapes as well as hexagons, squares etc. Core 30 forms a closed magnetic circuit having a high permeability. Normally this path is free from any airgaps, etc., however if desired it may include one or more airgaps.

A primary winding 34 is wrapped around one side of the core 30. As a consequence a current in this primary winding 34 will produce a flux field that extends entirely around the core 30. The primary winding 34 is interconnected with an oscillator 36 whereby an alternating current flows in the winding 34 and produces an alternating magnetic field having the same frequency as the current.

The frequency of the current and field may be of any desired amount. However, for reasons that will become apparent subsequently, it is desirable for the driving frequency to be on the order of at least 10 times greater than the frequency of the unknown magnetic field being measured. By way of example, in a typical nondestructive testing system 12 the driving signal may be in a frequency range of a few kilocycles or less up to ten megacycles or higher.

Although the waveform of the current from the oscillator 36 is not particularly critical it is normally substantially a sine wave. Moreover, the amplitude of the current is not particularly critical. However the current is preferably large enough to insure the core 30 being driven completely beyond saturation for a substantial portion of each half-cycle whereby the flux density within the core 30 is represented by a generally flat top waveform. To facilitate this the core 30 may be made from a material having a high permeability and a low saturation. Also a pair of opposite sides 38 and 40 of the core 30 may be reduced in thickness to provide a pair of diametrically opposite flat edges. Although these two sides 38 and 40 saturate before the entire core does this causes a "flat top" on the flux density curve. This tends to reduce the amount of power required to drive the core to the saturation level.

The amplitudes of the flux in the two opposite sides 38 and 40 are shown by curves $\Phi_1$ and $\Phi_2$ in FIG. 2. When the flux in either side 38 or 40 is directed upwardly (as seen in FIG. 2) it is shown as positive (as seen in FIG. 3). If there is no external or ambient field all of the flux in the core 30 is produced by the current in the primary winding 34 and the flux in the two sides 38 and 40 will be equal but opposite, i.e. one headed up and one down. Under these circumstances each time the field reverses itself, the flux density in both sides 38 and 40 will pass through zero at the same time. In other words, the flux in the two sides are completely symmetrical substantially as shown in the first portion of FIG. 3.

If the probe 10 is disposed in an external ambient field parallel to the two sides 38 and 40, there will be a corresponding flux component in each side 38 and 40. This component will add to the flux in one side and subtract from the flux in the other side. This will cause the flux field in the two arms to be somewhat asymmetric, as shown in the second and third portions of FIG. 3. The maximum flux densities in the core 30 and the two sides 38 and 40 will still be equal to saturation. However, because of the additive and subtractive nature of the components, the flux in one side will reverse itself earlier than normal while the flux in the other side will reverse itself later than normal. As a consequence the flux in the two sides 38 and 40 will not reverse themselves symmetrically and will not pass through zero at the same instance.

A secondary winding 42 is wrapped around the entire core. Preferably this secondary winding 42 is positioned around the two flattened sides 38 and 40.

This winding 42 is responsive to the sum total of the rates of change of the flux within the two sides 38 and 40. Accordingly if there is no external field and the flux in the two sides 38 and 40 change identically the affects in the winding 42 will be equal and opposite. Accordingly there will be no net voltage produced in the secondary winding 42.

However, if there is an external or ambient field passing through the core 30 the flux in the two sides 38 and 40 do not reverse symmetrically. Accordingly an unbalanced condition now exists and a pulse will be produced in the secondary winding 42 each half cycle. The frequency of these pulses will thus be double that of the oscillator.

The polarity of the pulses 44 and 46 from the secondary winding 42 will be a function of the direction of the external field. More particularly if the external flux is in a first direction, the flux $\Phi_1$ in one side 38 will reverse before the flux $\Phi_2$ in the other side 40 at one half-cycle. Approximately 180° later at the next half-cycle the flux $\Phi_2$ will now reverse before the flux $\Phi_1$. As a consequence every half-cycle a positive pulse 44 is produced in secondary winding 42 as seen in the second portion of FIG. 3. However, if the external flux field is in the opposite direction, the shifting of the flux changes in the two sides 38 and 40 will now be reversed and similar to that seen in the third portion of FIG. 3 and a negative pulse 46 will be produced.

The amplitudes of these pulses 44 and 46 are a function of the amplitude of the external magnetic field present in the two sides 38 and 40 at the precise instant that the field produced from the primary winding 34 reverses. It may thus be seen the envelope of the pulses 44 and 46 will be a function of the direction and amplitude of the external field. If the frequency of the oscillator 36 is high enough, for example at least 10 times as high as the frequency of the external field, the envelope will be very closely correlated with the amplitude and direction of the external field. It has been found that by a proper selection of core materials, driving frequencies etc. relatively high-frequency magnetic fields variations, i.e. the kilocycle or even megacycle range, can be accurately measured.

The output from the secondary winding 42 may be coupled to any suitable means for utilizing the pulses 44–46. In the present instance the winding 42 is coupled to an amplifier 48 which is effective to increase the amplitude of the pulses to a more useful level and to thereby improve the signal-to-noise ratio.

The output from the amplifier 48 is in turn coupled to a demodulator 50. The demodulator 50 is effective to demodulate the pulses and provide an output signal that corresponds to the envelope of the pulses 44–46. If the probe 10 is used to measure a steady or nearly steady magnetic flux field, the pulses 44–46 will all have the same amplitude or nearly the same amplitude. Accordingly the demodulator 50 must be capable of producing a DC signal.

However in a nondestructive testing system 12 such as the present one, the probe 10 normally scans the workpiece 14 at a relatively high rate of speed and the variations in the flux field, as seen by the probe 10, will have a correspondingly high fundamental frequency. If the probe 10 passes over a long crack it will do so once during each revolution of the workpiece 14. Since the stray field emerges from the workpiece 14 on one side of the crack and returns into the workpiece on the opposite side of the crack the probe 10 first passes through a field extending in one direction Land then passes through a field extending in the opposite direction. Under these circumstances the envelope of the pulses 44–46 in the secondary winding 42 and the output from the demodulator 50 will be a signal having a first portion of one polarity followed by a second portion of another polarity similar to FIG. 5A. If it is desired to increase the signal-to-noise ratio of such a signal and to increase the ability to resolve defects, a differentiator 52 may be coupled to the output from the demodulator 50. This provides a pulse having an amplitude corresponding to the rate of change of the signal. As a result this provides a pulse having a very short duration, a single polarity and a high amplitude similar to FIG. 5B.

The output from the differentiator 52 may be coupled through a second amplifier 54 to any suitable output means. For example, an alarm 56 such as a bell or light may be provided so as to produce an indication whenever a defect occurs. Also an oscilloscope 58 may be provided for producing a visual display of the characteristics of the workpiece 14. In the event the oscilloscope 58 is employed it has been found desirable for a pickup 60 to be coupled to the rotating workpiece 14 so as to synchronize the scanning. This permits the location of the defect to be determined by the position of the display.

In order to use the present embodiment the workpiece 14 may first be magnetized by circulating a current axially therethrough for a few seconds whereby a residual circumferential magnetic flux field is produced. If there are any longitudinal defects, such as cracks etc. a stray magnetic field will be produced above the surface of the workpiece.

The workpiece 14 is now rotated by the motor 20 while the search unit 22 is moved axially along the guide 24. The probe 10 in the search unit 22 thereby scans the entire surface of the workpiece along a spiral path. Normally the workpiece 14 is free from any discontinuities and the magnetic field present in the probe 10 remains substantially constant. Under these circumstances there will be little or no signals produced by the probe 10 and the output of the demodulator 50 and differentiator 52 will be substantially zero. As a consequence neither the alarm 56 nor oscillator 58 will provide any indications of a defect.

In the event a defect is present in the area being scanned, each time the workpiece 14 rotates one complete turn the probe 10 will pass through the stray magnetic field adjacent the defect. During this interval a pulse 44 or 46 occurs in the secondary winding 42 during each half cycle of the oscillator as shown in FIG 3. As the probe 10 advances toward the defect it enters the field and the envelope increases to a maximum positive peak. Then as the probe passes over the defect the envelope rapidly reverses and rises to a maximum negative peak. The envelope then returns to zero as the probe retreats from the defect. The output from the demodulator 50 will thus be a signal similar to that in FIG. 5A.

This signal is coupled through the differentiator 52 and differentiated to produce a high amplitude very narrow or short duration signal similar to that in FIG. 5B. Because of the increased amplitude and shorter duration this signal enhances the systems ability to resolve defects and particularly small ones. The differentiated pulse is then amplified and coupled to the alarm 56 and/or oscilloscope 58 so as to produce an indication of the defect.

It has also been found that under many circumstances it is preferable to detect defects by observing the gradient or rate of change of the flux in and around the defect rather than measure its absolute value. Under these circumstances it may be desirable to employ a structure similar to one of the embodiments shown in FIG. 4 to 9.

In the embodiment of FIG. 4 a probe 70 and the workpiece 72 may be arranged to allow the probe 70 to scan the entire workpiece 72 in any suitable pattern. This probe 70 includes two separate magnetic cores 74 and 76. These cores 74 and 76 may be substantially identical to each other and to the core 30 in the first embodiment. More particularly each core 74 and 76 is an annulus or ring having an open center and two flattened sides. A single primary winding 78 (corresponding to primary winding 34) is wrapped around both of the cores 74 and 76. This winding 78 passes through both of the center openings and is effective to produce substantially identical annular fields in both cores 74 and 76. This winding 78 is coupled to an oscillator 80 substantially the same as in the first embodiment.

In addition a secondary winding 82 and 84 is provided on each core 74 and 76 (corresponding to the secondary winding 42). Each of the secondary windings 82 and 84 are wrapped entirely around its respective core 74 or 76 so as to be coupled to the flux in the opposite or flattened sides of the core. Each of the two windings 82 and 84 are inductively separated or isolated from the opposite core and winding. As a consequence a change of flux in one core will not produce any signals in the winding on the other core. These two secondary windings 82 and 84 will thus produce voltage pulses representing only the external flux present in its respective core, similar to those in FIG. 3.

Although the two windings 82 and 84 are inductively separated from each other they are electrically interconnected with each other. The secondary windings 82 and 84 are preferably coupled in series opposition. If the probe 70 is in a flux field of uniform density the external flux in each core 74 and 76 is identical and the pulses produced by the two secondary windings 82 and 84 will be exactly equal and opposite to each other. As a consequence the total output voltage from the probe 70 will be zero. However if the probe 70 is disposed in a flux field having a gradient, the flux in the two cores 82 and 84 are no longer identical and the signals from the two secondary windings 82 and 84 will not be equal and opposite. Accordingly the two signals will not completely cancel each other. The resultant difference signal will therefore be a function of the gradient of the field present between the two cores 74 and 76.

As described above if a defect is present a stray magnetic field appears above the surface of the workpiece 72. If the defect 86 is near the surface, as shown in FIG. 4, a major portion of the stray field is present above the surface and substantially symmetrically about the defect 86. The wider and/or deeper the crack the greater the height and width of stray field. As a consequence the flux gradient in the circumferential direction will be considerably lower than for a crack that is very shallow and near the surface. If the defect is buried beneath the surface the circumferential field gradient will also be low. (See FIG. 7.)

As the probe 70 approaches a defect the leading core is in a denser field and a progressively increasing unbalanced voltage occurs until about the time the leading core passes over the defect. At this time the unbalanced voltage reaches a maximum and begins to decrease. When the two cores 74 and 76 are symmetrically disposed above the defect 86 (as seen in FIG. 4) the external field present in the two cores 74 and 76 is generally parallel to the surface and equal in both cores 74 and 76. As a consequence no Lunbalanced voltage is present. As the two cores 74 and 76 pass over the defect and retreat therefrom the two cores are again unbalanced but in a reverse direction whereby a second but inverted pulse occurs.

It can thus be seen the output from the two secondary windings 82 and 84 will be a voltage pulse similar to FIG. 5A. However since the two secondary windings 82 and 84 are opposed only the difference remains. As a result the amplitude of the envelope in FIG. 5A is now independent of the presence of absence of any background flux field. Instead it is dependent only upon the flux gradient produced by the defect and as a consequence it is much sharper and higher than with the prior embodiment. It is also substantially independent of stray signals or noise such as produced by surrounding machinery, lighting fixtures, etc.

Accordingly the ability to resolve defects and particularly small ones is greatly increased by the use of this embodiment. It should be noted the ability to measure a field gradient is dependent upon the spacing between the two cores 74 and 76. If it is desired to measure high gradient fields, for example when locating very small surface defects, the cores 74 and 76 are normally very small and very close. However, if small defects are of minor interest and it is desired to locate deeper defects the cores 74 and 76 may be separated by a greater distance and/or the sizes of the cores increased so as to only sense broad fields having low gradients. Accordingly this probe 70 can provide a means for discriminating between various types of defects by varying their size, spacing etc.

In order to improve the characteristics of this probe 70 it may be coupled to a differentiator 88 similar to the first embodiment. This is effective to produce a very sharp signal (i.e. a very short duration pulse) substantially coincident with the two cores 74 and 76 passing over the defect 86. It will thus be seen that this arrangement is relatively insensitive to any ambient magnetic fields which produce substantially identical effects in both cores 74 and 76. However with the differing arrangement of the secondary windings 82 and 84 the probe 70 is sensitive to stray fields which produce a gradient effect between the two cores.

It should also be noted when this probe 70 is moved in a radial direction towards or away from the surface of the workpiece 72 the field gradient on the opposite sides of the defect 86 and in the two cores 74 and 76 will vary symmetrically, particularly when the two cores are symmetrical with the defect 86. As a consequence with this arrangement the probe 70 is relatively insensitive to variations in the spacing between the probe 10 and the workpiece 72. However, if desired, either the primary 78 and/or secondaries 82 and 84 may be tuned by adding condensers etc. as described in the first embodiment.

As a further alternative the embodiment of FIG. 6 may be employed. This arrangement is similar to the preceding in that probe 90 includes two cores 92 and 94. However these cores 92 and 94 are disposed in a common plane and substantially radial to the surface 96 of the workpiece 98. A single primary winding 100 is coupled to both cores 92 and 94 and to an oscillator. A separate secondary winding 102 and 104 is coupled to each core 92 and 94 as described above. These windings 102 and 104 are interconnected in a series-differing mode similar to probe 70. Accordingly the same flux field in the two cores 92 and 94 will not produce any signal from the probe 90. However if the probe 90 passes through a stray flux field having a radial gradient, the difference between the flux in the two cores 92 and 94 produces a very large amplitude difference signal from the two secondary windings 102 and 104.

Since the flux density of a stray field decreases very rapidly in the radial direction, this probe 90 is very sensitive to variations in the spacing between the probe 90 and the workpiece 98. As a consequence this arrangement is especially useful when it is desired to measure variations in the surface 96 of the workpiece 98. For example, irregularities in the surface such as flat spots etc. will produce large variations in the spacing and corresponding variations in the signals.

As a further alternative the embodiment of FIG. 7 may be employed. This embodiment is similar to the preceding embodiments except that the probe 106 contains two cores 108 and 110 which are now disposed in two separate planes generally parallel to the surface 112 of the workpiece 114. These cores 108 and 110 are substantially identical to the preceding cores and are driven by a single primary winding 116. A pair of secondary windings 118 and 120 are preferably arranged in a differencing mode. As a consequence this probe 106 is responsive to the radial flux gradients.

A comparison between the lift-off or spacing characteristics of this probe 106 and the probe 90 of FIG. 6 are illustrated by the curves 122 and 124 in FIG. 8. The X-axis or abscissa is the space between the probe while the Y-axis or ordinate is the voltage from the secondary windings. It may be seen the response of the radial probe 90 (as represented by curve 122) decreases very rapidly as the spacing increases. Accordingly the radial probe 90 is better suited to measurements of changes in shape, surface, roughness etc. Although tangential probe of FIG. 7 (as represented by curve 124) is also somewhat responsive to variations in spacing this response is of a considerably lower order. Accordingly this probe 106 is particularly useful for detecting the radial flux gradients resulting from defects which are located a considerable distance below the surface 112.

As a further alternative the embodiment of FIG. 9 may be employed in this embodiment. This probe 128 includes a series of cores 130 which may be substantial identical to the preceding cores. Although any desired number of cores may be utilized, in the present instance six are shown.

These cores 130 are arranged in a generally circumferential direction (i.e. in a line parallel to the direction of the scan). The cores 130 are all substantially uniformly spaced from each other. They may be driven by a single primary winding or a plurality of separate primary windings 132. Secondary windings 134 are also provided to produce pulses corresponding to changes in the flux in the cores 130. It can be seen that if this probe 128 is positioned next to a rotating workpiece 136 containing a defect 138, the defect 138 will successively move past the cores 130. Each time the defect 138 passes a core 130 the corresponding secondary 134 will produce a pulse substantially as described above. Accordingly each time a defect is scanned by this probe 128 a series or sequence of pulses is produced. The period between these pulses corresponds to the rate at which the defect 138 travels past the successive cores 130.

The various secondary windings 134 may be coupled to a band-pass filter 140 by means of an amplifier 142 and demodulator 144. This filter 140 is tuned to only pass signals having a frequency corresponding to the frequency of the pulses being produced by the passage of the defect 138 across the probe 128. All other spurious signals are rejected. This tuning arrangement is thereby effective to greatly improve the signal-to-noise ratio in those situations where there are stray signals being received by the probe. It should be noted that the pass band of the filter 140 should be adjusted in accordance with the spacing of the cores 130, the speed of rotation of the workpiece 136 and the diameter of the workpiece 136. More particularly as the diameter increases the peripheral speed of the defect increases and accordingly the frequency will be higher.

It can be appreciated that this arrangement is particularly useful in those instances where there is a high probability of spurious transient flux fields having frequencies comparable to the frequency of the envelope of FIG. 5A. By employing a large number of cores, varying their spacing etc. an arrangement of this nature can be made very sensitive to frequencies corresponding to those produced by a defect and very insensitive to spurious signals of other frequencies.

The signals produced by the foregoing probes are alternating second harmonics. When the direction of the external field changes the phase of the second harmonic signal reverses. As a consequence it is usually desirable to provide some form of phase responsive demodulation. For example, the demodulator 50 may include a phase sensitive rectifier responsive to the phase of the driving signal circulated through the primary winding. Such an arrangement will provide a bipolar signal having a positive polarity for one field direction and a negative polarity for the opposite direction.

The embodiment 160 of FIG. 10 may be employed to provide a similar-type signal without using any form of phase sensitive rectification or demodulation. This embodiment 160 utilizes a simple rectifier such as a diode 162. In this embodiment the probe 164 includes an annular ring or core 166 which may be substantially identical to any of the preceding embodiments. A primary winding 168 is wrapped around one side of the core 166 and is coupled to an oscillator 170. This produces an alternating flux field extending circumferentially around the core 166 substantially the same as described above. A secondary winding 172 extends around the entire core 166 and is coupled to a suitable amplifier 175. This amplifier 175 is effective to amplify the signals similar to amplifiers 48 and/or 54 and may be coupled to similar output means.

In addition, a small biasing magnet 174 is provided diametrically across the core 166 so as to produce a DC magnetic biasing field within the core 166. This fields extends substantially symmetrical around the core 166 with respect to the axis of the secondary winding 172. The two sides of the core 166 within the ends of the secondary 172 therefore have substantially identical biasing fields. This biasing field shifts the operating characteristics from the dashed line 176 to the solid line 178 of FIG. 11.

The exact amplitude of the biasing field may vary according to the intended use of the probe 164. In the event the probe 164 is to be used for measuring a field having substantially equal amplitudes in opposite directions the biasing field produces fields in the core 166 which are equal to or substantially equal to the field produced by the external field at its maximum amplitude in one direction. This is normally approximately equal to one-half of the intensity of the field which could be measured by a similar ring without a biasing magnet, i.e. the biasing field is approximately half of what is required to saturate the core 166.

When the probe 164 is in a maximum intensity field in one direction (for example a negative field) the biasing field completely or substantially completely cancels the unknown field in the two sides of the core 172. Under these circumstances the net field in the two sides of the ring are zero. This condition corresponds to point A (FIG. 11) and there will be no signal in the secondary winding.

When the external field in which the probe 164 is disposed is substantially zero, the biasing field will be the only one present in the core 166. This produces a half-amplitude signal in the secondary 172. This corresponds to point B. When an external field has an intensity equal to the aforementioned maximum valve but in the opposite direction, the external field adds to the biasing field in the core 166 whereby a signal is produced. As can be seen in FIG. 11 this signal has an amplitude double the amplitude when the field is zero.

The secondary 172 may be coupled to the amplifier 175 by a simple rectifying means, such as the diode 162. This diode 162 simply eliminates the negative portions of the carrier wave (i.e. second harmonic) developed in the secondary 172 and leaves only the positive half-cycles. As long as the amplitude of the unknown field remains within the working range between points A and C the amplitude of the second harmonic signal passed by the diode 162 will be of a unipolar or positive polarity and linearly related to the amplitude of the external field.

When the external field is in a negative direction and just balances the biasing field, the output signal is zero. As the field increases in a positive direction the signal increases in a positive direction. Throughout this range the signal always remains positive and thereby eliminates the necessity for the phase sensitive rectifier. If it is desired to make the signal reverse polarity with the external field, a suitable biasing voltage may be added to the signal within the amplifier 175.

The foregoing arrangement is very simple and eliminates a phase sensitive rectifier and phase control means. However, it can be appreciated the working range, i.e. between points A and C is reduced to about one-half of the overall potential range of the probe 164. To overcome this difficulty and expand the working range the embodiment 180 of FIG. 12 may be employed. In this embodiment the probe 182 includes an annular ring or core 184 having a primary winding 186 and a secondary winding 188. The primary winding 186 is coupled to a signal source such as an oscillator 190 while the secondary 188 is coupled to an amplifier 192 by means of a rectifier such as the diode 194. These may be arranged substantially identical to the corresponding parts in the preceding embodiments.

In addition the secondary 188 is coupled to a source of a biasing signal so as to shift the operating characteristics of the probe so as to produce a unipolar signal. In this embodiment the characteristics are shifted from the characteristics represented by the dotted line 176 of FIG. 13 to the solid line 194 of FIG. 13.

Any form of biasing signal may be used. However, the present instance a second ring or core 196 having a primary winding 198 and a secondary winding 200 is provided. The primary winding 198 is connected to the oscillator 190 in series with the first primary 186. This insures the driving fields in the two cores 184 and 196 being of substantially identical amplitudes and phases. The two secondaries 188 and 200 are connected in series with and coupled to the amplifier 192. This insures the secondary signals being maintained in a constant relationship (i.e. phase, etc.)

The core 184 is adapted to be passed through the stray field to be measured. The second core 196 is separated from the first by a sufficient distance to isolate it from the unknown stray field. As a result even through the first core 184 may be in a stray field of considerable intensity, the second core 196 will only be in the ambient field.

A biasing magnet 202 is provided in the second core 196 so as to produce a symmetrical biasing field. The magnet 202 and core 196 are arranged substantially the same as in the embodiment of FIG. 10. More particularly this produces a field in the core 196 which is substantially equal to the field corresponding to a field of maximum intensity of one polarity, i.e. negative direction. As a result when the probe 182 is in a negative field the signal from the secondary 188 will be exactly equal and of opposite phase to the signal from the reference secondary 188. As a consequence the resultant signal from the two secondaries will be zero. As the field increases in a positive direction the signals from the secondary 188 will decrease to zero when the external field is zero. At this point the resultant signal is equal to the reference signal. If the external field continues to increase in the positive direction, the signal from the secondary 188 is now in phase with the reference signal and adds thereto. This will cause the resultant signal to increase until the core 184 saturates.

As can be seen in FIG. 13, this in effect raises the operating characteristics of line 194 upwardly above the region of the negative signals whereby only a unipolar signal is provided. However, since the characteristics between two points of saturation can now be used, the working range is double the range of the embodiment of FIG. 10.

While only a limited number of embodiments of the present invention are disclosed herein, it will be readily apparent to persons skilled in the art that numerous changes and modifications may be made thereto without departing from the scope of the invention. Accordingly, the foregoing disclosure and description thereof are for illustrative purposes only and do not in any way limit the invention which is defined only by the claims which follow.

I claim:

1. A nondestructive testing system for locating a discontinuity in a workpiece, said system including the combination of magnetic means for magnetizing said workpiece and producing a stray magnetic field adjacent the surface thereof in the area of said discontinuity, a search unit for being positioned adjacent the surface of the workpiece for scanning across said surface and through at least a portion of said stray field, a pair of juxtaposed magnetic cores in said search unit, scan means coupled to said search unit for scanning said search unit across the surface of said workpiece whereby said cores pass through said stray fields, each of said cores forming a closed circular magnetic path with a high permeability and a low saturation whereby at least a portion of said stray field extend through at least a portion of each of said cores, a primary winding on each of said cores for producing a flux field that extends therearound and combines with the separate resultant fields in each of said sides, a signal generator coupled to said primary windings for circulating driving currents through said winding, a secondary winding on each of said cores coupled to said sides and responsive to the separate resultant fields to thereby produce an output signal whenever said core passes through a stray field, and said cores being positioned so that said output signal is a function of the gradient of said stray field.

2. The nondestructive testing system of claim 1 wherein said cores are aligned and spaced in a direction normal to the surface of the workpiece whereby the output signal is a function of the field gradient in said direction.

3. The nondestructive testing system of claim 1 wherein said cores are aligned and spaced in the direction of said scan whereby the output signal is a function of the gradient in that direction.

* * * * *